POWER SPLITTING HIGH LEVEL RF MODULATOR

Filed Sept. 22, 1965 Sheet 1 of 3

INVENTORS.
JOSEPH BURNSWEIG, JR.,
LARRY H. O'BRIEN,
BY J. K. Haskell
ATTORNEY

POWER SPLITTING HIGH LEVEL RF MODULATOR

INVENTORS.
JOSEPH BURNSWEIG, JR.,
LARRY H. O'BRIEN,
BY J. K. Haskell
ATTORNEY.

INVENTORS.
JOSEPH BURNSWEIG, JR.,
LARRY H. O'BRIEN,
BY J. K. Haskell
ATTORNEY.

United States Patent Office 3,435,342
Patented Mar. 25, 1969

3,435,342

POWER SPLITTING HIGH LEVEL RF MODULATOR

Joseph Burnsweig, Jr., and Larry H. O'Brien, Los Angeles, Calif., assignors to Hughes Aircraft Company, Culver City, Calif., a corporation of Delaware Filed Sept. 22, 1965, Ser. No. 489,262
Int. Cl. H04b 1/04; H01p 5/12
U.S. Cl. 325—126 12 Claims

ABSTRACT OF THE DISCLOSURE

This disclosure relates to a system for modulating high level electromagnetic energy. The desired modulation is accomplished by applying the electromagnetic energy to a waveguide structure including a high speed switching device which is responsive to coded control signals applied thereto and which serves to either allow said electromagnetic energy to be propagated directly through the waveguide structure or be directed through a phase shifting device.

This invention relates to RF modulators and more particularly to a system for obtaining increased high power level RF modulation by dividing the power output of an RF energy source and code modulating the RF energy.

Intelligence, such as coded signals, is impressed upon RF energy signals by the process of modulation. In contemporary practice the modulation process operates directly upon the RF source devices of a transmitting system.

Prior art modulators which operate upon the device itself are limited by the bandwidth of the device, thus the amount of intelligence which can be impressed by modulation is also limited to that bandwidth. When the RF sources are incorporated in the transmitters, the reception range of the transmitters is limited to the power output of the source. Further, if the RF output source device is used in a radar system, the characteristics of high average power for long range, narrow pulse for range resolution, and conversely (since high average power implies long pulses and narrow pulses imply wide bandwidth) broad bandwidth for large amounts of intelligence are highly desirable. The contemporary practices of modulating the device compels tradeoffs among the characteristics, resulting in subordination or loss of a desired characteristic.

RF power devices in use today in transmitters include magnetrons, traveling wave tubes, klystrons, and other amplifier or oscillatory types of sources. All these devices have inherent limiting characteristics of frequency instabilities, non-linear amplification of wide band signal frequencies, or random starting phases. All means used to modulate the devices are intrinsically limited in intelligence bandwidth.

Prior art modulators have been improved due to advances in the rapid switching capabilities of diodes and other switching-type semiconductors. However, these types of switches are limited to low level power handling capabilities, and are also operative upon the power output device.

The present invention presents a unique solution to the problems encountered by the prior art. This invention provides modulation of the RF energy output signal from the power output device, divides the energy to reduce the needed power handling level of the switching device, permits a higher level of power handling, reduces energy loss, and permits amplitude equalization or amplitude coding as well as phase code modulation.

Accordingly, it is an object of the present invention to provide a novel modulating system for RF energy.

Another object of the present invention is to increase the power handling capability of an RF modulator by splitting the power.

A further object of the present invention is to eliminate high arc losses caused by full power handling capability of multipactor designs.

It is an additional object of the present invention to permit the use of standard waveguide junctions and lower rated power switches than previously attainable.

A further significant object of the present invention is to provide a phase coder also capable of amplitude modulation.

Briefly, the present invention according to one embodiment achieves high power level RF modulation in an arrangement which combines a code generator, pulse generator, a pair of short-slot hybrid waveguide junctions, a phase-shifter, and a pair of high speed switching devices. The use of a short-slot as a waveguide junction to obtain reciprocal operation is well known in the art. High speed switching devices usable in the present invention include multipactors, which are discussed later in this application. Slower speed switching devices such as gas discharge tubes, gated gaseous discharge tubes and their equivalents may also be used. Uncoded high level RF energy enters a first port of a first multiport hybrid waveguide junction, where it splits into two equal components (portions) of energy. High speed switches are located at a second and third port of the hybrid structure; when quenching voltage is applied by the pulse generator to the switch, one portion of the energy passes through the second port, and the other portion passes through the third port. These two portions of energy recombine in a second complementary hybrid waveguide junction, which is part of the structure, unshifted in phase, and exit through the second hybrid energy exit port. However, if quenching voltage is removed from the switches, at the second and third ports of the first hybrid, the split energy is reflected by the switch, recombines at the fourth port, passes through a phase shifter, and enters a first port of the second hybrid. Upon entry to the second hybrid, the energy splits into two portions, is reflected by the switches, recombines and exits through the second hybrid.

The features, objects and advantages of the present invention will appear from the following description of exemplary embodiments thereof illustrated in the accompanying drawings wherein like reference characters refer to like parts, and wherein.

Figure 1:
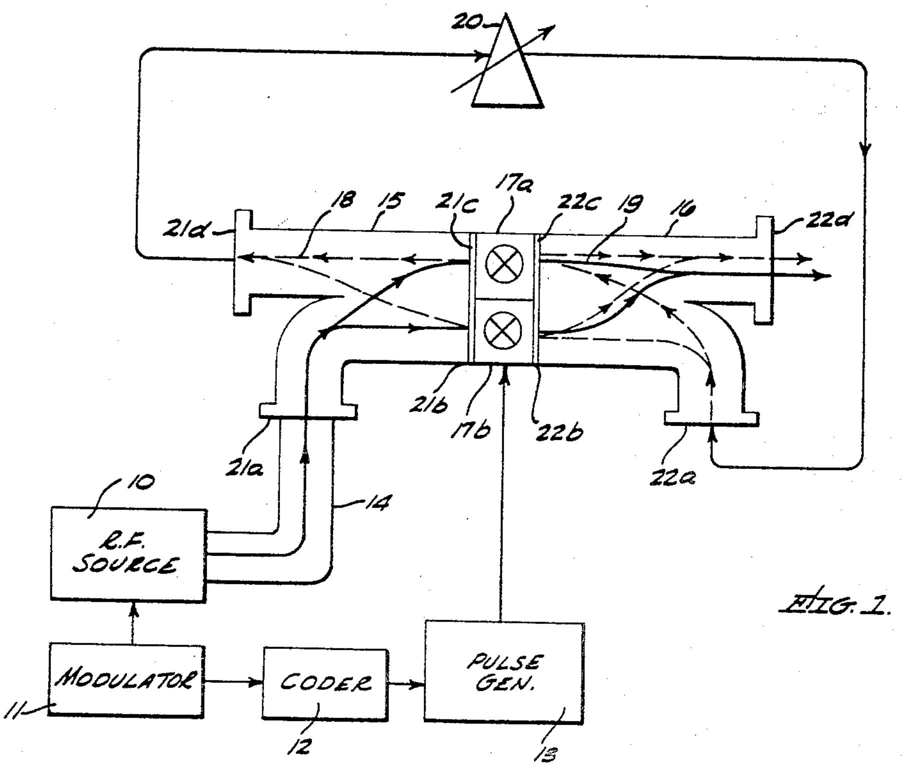
FIGURE 1 is a schematic block diagram broadly illustrating a power splitting high level RF modulator embodying the principles of the present invention.

FIG. 1 illustrates the microwave coding embodiment of the present invention. RF energy is generated by a RF source 10 and is coupled to hybrid junction 15, which may be a Riblet short slot, magic T, or hybrid ring, by a transmission feed line 14. These hybrids are also referred to in this application as "microwave devices." The RF source 10 may be any source of RF energy, or a device such as a magnetron, travelling wave tube, or a klystron. A modulator 11 modulates the RF source device by conventional means. A coder 12 is synchronized with the modulator 11 by conventional pulse synchronizing methods. Excitation of the coder 12 by the synchronizing pulse from the modulator 11 causes the coder 12 to generate a pulse wave-train for variable time duration, spacing and amplitude. A pulse generator 13 is connected to and controlled by the output of the coder 12 and responds to the wavetrain by generating a sequence of quenching voltage pulses as determined by the coder 12. The RF energy from the RF source 10 enters the hybrid 15 via the entry port 21*a* where it splits into two equal portions, one portion is directed toward port 21*b* while the other portion is directed toward the port 21*c*. If the code signal to the pulse generator includes a switching level pulse, the pulse generator 13 generates a quenching voltage pulse during each interval of the coded pulse. Quenching voltages are negative in sign. These time intervals are predetermined by the coder 12. The quenching voltage pulses cause the switching devices 17*a* and 17*b*, located at the ports 21*c* and 21*b*, to turn on, and thereby permitting RF energy to pass through the devices to complementary hybrid junction 16. Although two switching elements are used, they are operated in parallel, and will be referred to as the "switching device." In the absence of a quenching voltage the switching devices 17*a* and 17*b* are off, RF energy that has been split reflects from the switch at ports 21*b* and 21*c*, recombines as shown by path 18 at the port 21*d*, and is routed through a phase shift device 20, where it is phase shifted by a predetermined amount and is routed to the entry port 22*a* of the complementary hybrid 16. The phase shifted RF energy is split as it enters entry port 22*a* and follows the path 18. One portion of energy is reflected at the port 22*b*, the other portion is reflected at the port 22*c*, and both portions recombine at the port 22*d* and exit therefrom.

In the event that quenching voltage pulses are generated by the pulse generator 13 the RF energy generated by RF source 10 will pass from the hybrid 15 to the complementary hybrid 16 through the ports 21*c* to 22*c* and ports 21*b* to 22*b* as shown by path 19. After passing through these ports, the energy recombines and exits from the port 22*d*. In the present discussion, the terms ports, terminals, and branches are used interchangeably.

Exit port 22*d* may be connected directly to an antenna, or to any other device using the energy. Phase shifter 20 may be a fixed or variable phase shift device, depending upon the versatility required of the present invention. The phase shifter 20 may be any of the following types: line stretcher, a line length, dielectric material, or ferrite material in the waveguide, all of which are well known to persons skilled in the art. A binary phase code may be impressed upon the RF energy, by having the phase shifter preset to 180°. In such case energy passing through the phase shifter would be shifted 180 degrees, while energy passing through ports 21*b* and 21*c* during a quenching pulse coded time interval would have zero degree phase shift.

Hybrid junctions, which are usable in the present invention, include the magic T, the hybrid ring, and the Riblet short slot. The hybrid ring is sometimes referred to as "the rat race." These hybrids are well known to those skilled in the art and are described in "Microwave Principles" by Reich, Skalnik, Ordung and Krauss, published by the Van Nostrand Company, 1957.

Intelligence, as previously mentioned, is impressed upon the RF carrier by the process of modulation; the coder provides the "instructions" on what type of intelligence is to be impressed. The coder 12 generates a coding signal in the form of a wavetrain or series of pulses, which may be in the form of a binary code, analog code, or a combination. As an example, a code of "three" may consist of ++−+ wherein the plus (+) refers to a "one" or high state and a minus (−) corresponds to a "zero" or low state. These states exist during a predetermined time interval called a "bit." These bit time intervals may be in microseconds, tenths of a microsecond, or in nanoseconds. A longer code such as a code of "five" may be designated as +++−−+. Thus a code of any length in arrangement of the bits may be generated by the coder.

From the prior discussion, it may readily be understood that the coder 12 will have a coded output signal predetermined by the code length, which will in turn cause a pulse generator 13 to generate either a low level signal or a high voltage (negative) quenching signal.

The binary code determines the operation of the switching device located at the ports of the hybrid and the operation of the switching device causes the phase shift of the RF energy. The combination of binary code and the phase shift produces a binary phase code. Among the pulse compression codes which may be used are the Barker codes described in "Group Synchronizing of Binary Digital Systems," by R. H. Barker, and "Communications Theory," Academic Press, London, 1953; also usable are the codes of De Long as described in "Experimental Autocorrelation of Binary Codes," by D. F. De Long, M.I.T., Lincoln Labs Report No. 47G0006, of Oct. 24, 1960.

Polyphase codes, which is the form of a binary code with a variety of phase shifts, may also be used in accordance with the principles of the present invention. Polyphase codes are described in a paper by Robert L. Frank entitled "Polyphase Codes with Good Non-periodic Correlation Properties" from the IEEE Transactions on Information Theory, January 1963.

Examples of analog code forms may be voice, varying amplitude levels, or stepped amplitude levels.

Pulse generator 13 may be a hard-type pulser, line-type pulser, or a distributed amplifier. These pulse generators are well known in the art and are described in vol. 5 of "Radiation Laboratory Series," published by McGraw-Hill. The phase shifter 20 is well known to those skilled in the art and is described in the same volume referenced under the discussion of hybrids.

The switching time in the order of a few nano-seconds of a multipactor is equivalent to an RF cycle at certain frequencies. Such features of the multipactor make it preferable to other switches. Multipactors have been used in the prior art in duplexing and switching applications. These multipactors are well known to those skilled in the art, and their characteristics are described in "Duplexing and Switching with Multipactor Discharges" by M. P. Forrer and C. Milazzo in the April 1962 Proceedings of the I.R.E. Multipactor devices appear in several forms, including the multiple port and single port types, and are unique as high vacuum RF switches. Thus far, the prior uses of the multipactor as described in the above referenced article have been limited to only switching applications to isolate transmitters from receivers, and to only divert RF energy in waveguides. It is pointed out that the pulse rise time of a generated driving pulse to quench the multipactor action does not directly determine the switching time of the multipactor, since the multipactor switching time is operating in a regenerative mode. Since it is a high vacuum device, extremely rapid (order of nanoseconds) recovery times are possible. Voltages of the order of hundreds or thousands of may be required from the pulse generator, depending on the multipactor characteristics. The quenching voltage applied to the multipactor inhibits electron multiplication or discharge (multipaction). When quenching voltage is removed, the RF energy stimulates multipaction. Thus, the quenching voltage inhibits the secondary electron multiplication otherwise stimulated by RF energy.

Figure 2:
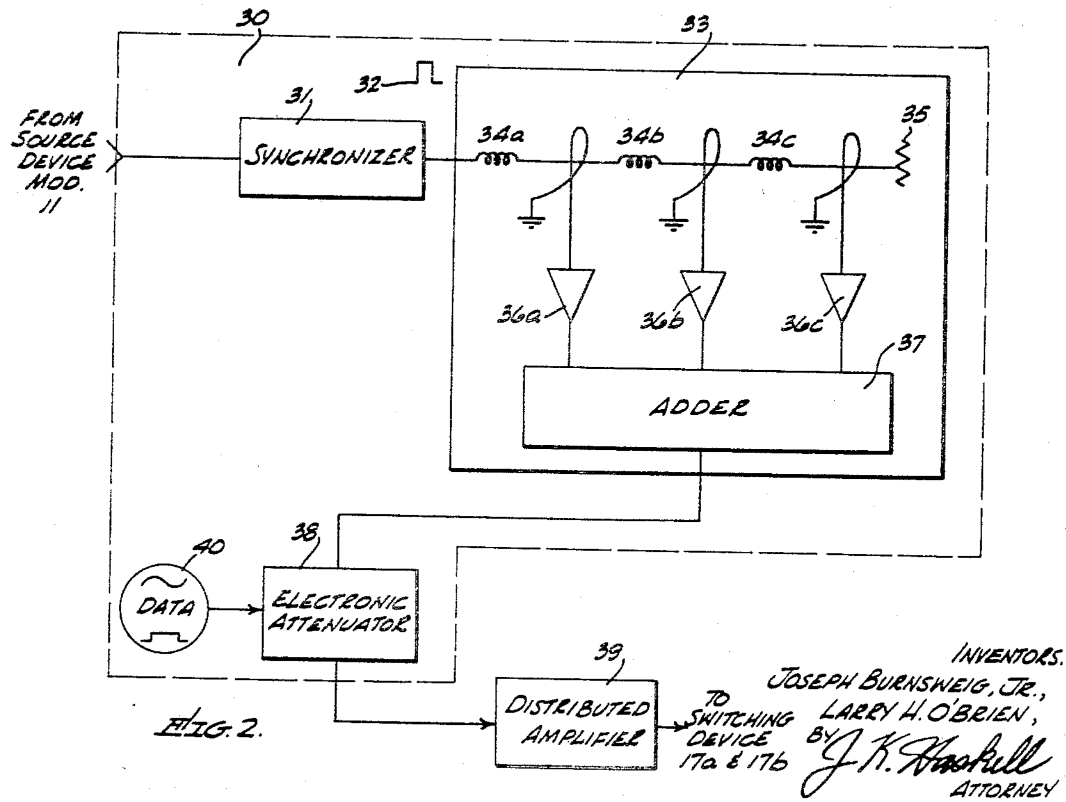
FIGURE 2 is a schematic diagram illustrating the development of coding for both phase and amplitude modulation.

FIG. 2 is a schematic diagram of a typical coder 30 which may be used in but not limited to the present invention. To develop a pulse code for multipactor switching, synchronizer 31 provides synchronous timing between the modulator of the source device and the coder 30 by generating the synchronous pulse 32. The synchronizing pulse 32 enters the delay line 33 which has multiple taps, each tap corresponding to a bit delay time or multiple bit delay times. Bit delay pick-off points 34*a* through 34*c* are preselected on the basis of the bit time delay interval desired. The delay line 33 is terminated by the termination 35. Amplifiers 36*a* through 36*c* provide sufficient amplification levels of the delayed pulses to drive a distributed amplifier 39 after the pulses are first processed through adder 37. The amplifiers 34*a* through 34*c* are well known in the art, as well as distributed amplifier 39. The distributed amplifier 39 generates the high speed voltage switching pulses according to the code determined by the coder to operate the switching device. Use of a distributed amplifier as the pulse generator is desirable for high-speed switching applications (bit width less than 100 nanoseconds). For slower speed switching (above 100 nanoseconds) pulse generation of the hard tube or line type pulsers are adequate. There is also shown at FIG. 2 an electronic attenuator 38 connected between the adder 37 and the distributed amplifier 39. Electronic attenuators are well known in the art. The electronic attenuator 38 is also connected to a data input source 40. To provide simple binary phase coding, the adder 37 would be directly connected to the distributed amplifier 39, instead of to the electronic attenuator. However, for more complex coding consisting of analog and binary phase coding or polyphase coding, the input data source 40 and the electronic attenuator 38 would be connected as shown between the adder 37 and the distributed amplifier 39.

Figure 3:
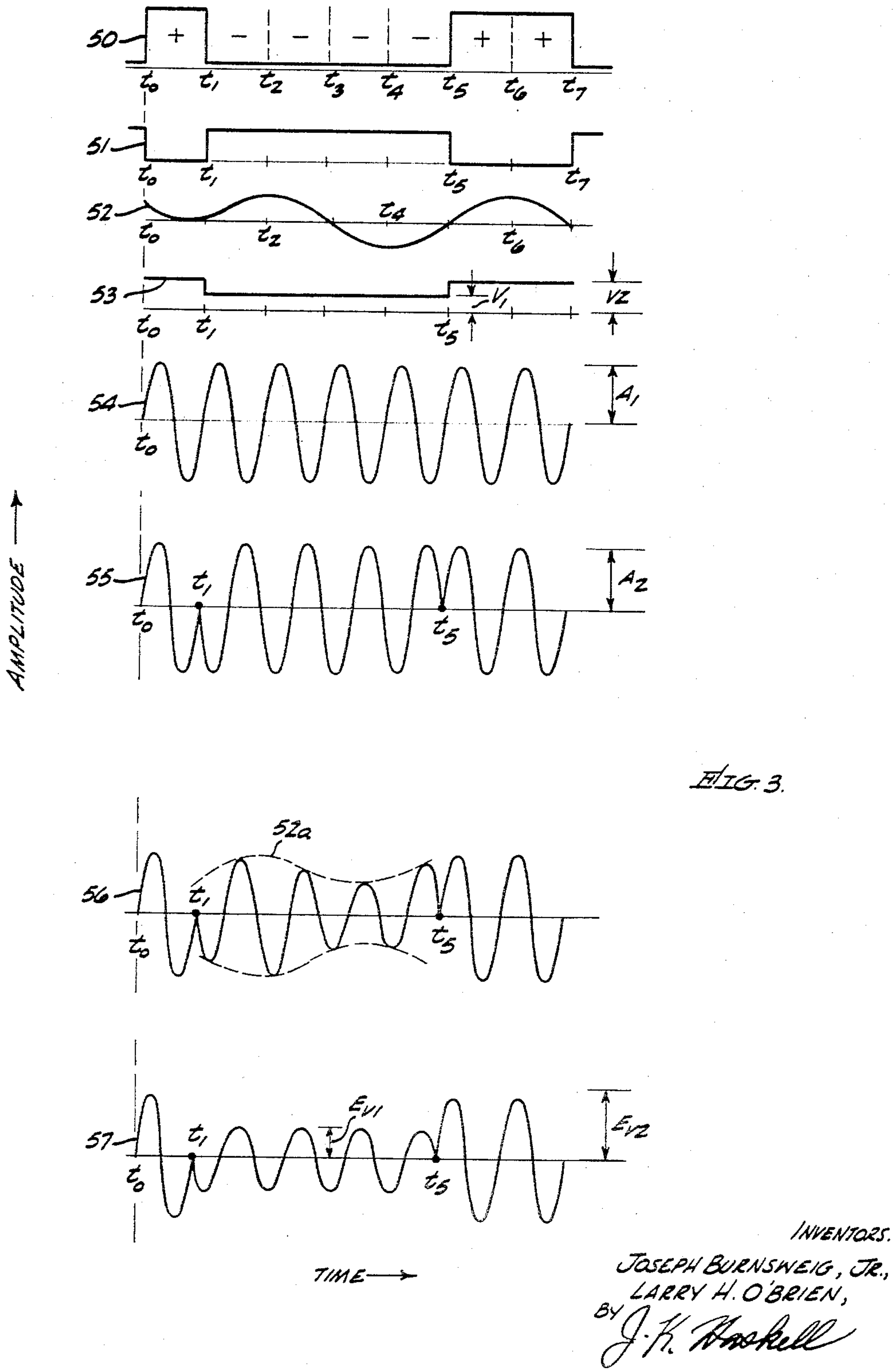
FIGURE 3 illustrates the waveform relationships of code signals, switching signals, and output signals for several modes of operation.

Turning now to FIG. 3, there is shown a series of waveforms, where the waveform 50 represents the coder output signal for a code of seven. This code of seven, over the time intervals $t_0$ to $t_7$ is chosen to be +, 4−, and 2+. (+−−−−++). As previously described, the code may be of any length, but a code of seven is chosen for illustrative convenience only. Also for illustrative purposes, the equal bit time intervals, $t_0$ to $t_1$, $t_2$ to $t_3$, etc., are selected to correspond to a single cycle of the RF carrier. The source RF signal carrier waveform is shown at 54, having a time duration T and an amplitude magnitude $A_1$. Of course, the time interval T corresponds to the total coded time interval $t_0$ to $t_7$ of the coder.

The waveform 51 represents the quenching voltage pulses from the pulse generator. These quenching voltage pulses are large negative-amplitude pulses. The pulses shown at waveform 51 are at a low state (quenching voltage generated) during the time interval $t_0$ to $t_1$; a high state (no quenching voltage) exists during the time interval $t_1$ through $t_5$, and a low state exists from $t_5$ to $t_7$. For simple binary phase coding purposes (i.e.: phase shifter of FIG. 1 set to 180° shift), the signals 50 and 51 will suffice. As previously mentioned, the bit time intervals selected for illustrative purposes are equivalent to a single cycle of the RF carrier. However, in other applications the switching time may not necessarily correspond to a single cycle of the RF carrier. For instance, if X-band energy was selected of frequency 10 gc., then this corresponds to 10 cycles of X-band per nanosecond. If 5 gc. C-band energy were the carrier frequency, then 5 cycles occur in one nanosecond. Similarly, one gc. L-band corresponds to one RF cycle in one nanosecond. Waveform 55 represents binary phase code operation on the RF carrier 54 by the coder output signal 50 and the code signal response of quenching voltage pulses 51.

The following table provides a tabulated explanation of the binary phase code together with operations taking place at waveform 55. This table is best understood by referring to the circuits illustrated in FIGS. 1 and 2.

| Bit time interval | Apply quench voltage | Code | RF carrier phase change (deg.) | Switch device condition |
|---|---|---|---|---|
| $t_0$ to $t_1$ | YES | + | 0 | ON |
| $t_1$ to $t_5$ | NO | −−−− | [1] 180 | OFF |
| $t_5$ to $t_7$ | YES | ++ | 0 | ON |

[1] Reference.

During the coded bit time interval $t_0$ to $t_1$, a quenching (indicated by + at waveform 50) voltage (negative level at waveform 51) is applied to the switching device. Thus, RF energy passes through the switching device unchanged in phase. When the quenching voltage signal is not applied (indicated by − at waveform 50) to the switching device during the interval $t_1$ to $t_5$, the RF energy reverses phase during this same time interval. The phase reversed (shifted) RF carrier retains the same amplitude characteristic $A_2$ and is equivalent in amplitude to the original RF carrier amplitude $A_1$. It is to be noted that if a circulator device should be used instead of a hybrid, a diminution of amplitude would occur during the time of the phase shift, thereby having a reduction in the value of the carrier amplitude. That is, $A_1$ and $A_2$ would be unequal. The main cause of the reduced amplitude is the loss caused by the necessity of full power handling capability of the switching device and multiple passage through the non-reciprocal device. Because the hybrid permits the splitting of power, there is less or nearly zero amplitude loss.

Waveform 56 represents a more complex form of binary phase coding in that both amplitude and phase coding of the RF carrier takes place. The waveform 56 is a result of the introduction of analog data shown at waveform 52 together with the quenching voltage signal 51. As mentioned in the descriptive discussion of FIG. 2, the complex coding is made possible by the operation of the input data source 40 and electronic attenuator 38 of FIG. 2. Waveform 56 is both amplitude and phase coded during the time interval $t_1$ through $t_5$.

Another example of complex amplitude and binary phase coding the RF carrier is shown at waveform 57. In this example, a stepped change in amplitude of the RF carrier takes place during the time interval $t_1$ to $t_5$. Such an effect would be caused by selectable attenuation capability of the electronic attenuator.

If the RF source device is a magnetron, these simple binary phase changes impressed upon the magnetron RF pulse carrier effectively code the carrier. With the magnetron pulses coded on each transmission, the coded pulse could be receiver sampled, the return signal is capable of pulse-to-pulse decoding. Such a feature makes the present invention highly desirable in data processing type radars. For narrow pulse operation, as may be required for a radar having long range and high resolution capability, the use of a multipactor for switching provides switching time in the order of a few nanoseconds.

If a traveling wave tube is employed instead of a magnetron as the power output device, broad bandwidth coding operation is achieved without the time delay distortion normally caused by the inherent characteristics of such power output devices.

Communication systems may demand analog coding, such as voice, in addition to phase coding. Such a feature is highly desirable in space communications, or other long distance communications.

The combination amplitude and phase code capability of one embodiment of the present invention would be of use in contemporary electronically steerable antennas as a beam shaper. Although the main discussion of the hybrids used in the various embodiments has been limited to symmetrical configurations, it is also understood that non-symmetrical hybrids are useful. As an example, the use of longer and shorter ports with differing impedances could be employed to act as an impedance modulator. Among the uses for an amplitude and impedance modulator embodiment would be for antenna beam shaping in electronic steerable antennas.

In electronic steerable antennas, because of the high speed of beam positioning, a time pattern with undesired side lobes is generated by the radar. Since there is no beam shaping in electronically steerable antennas, undesirable side lobes are generated in the frequency domain.

To correct for these side lobes, it is customary to amplitude weight the transmitter output. Thus, when beam switching occurs, i.e.: beam movement, amplitude weighting (in time domain) results in frequency domain correction for the undesired side lobes.

Figure 4:
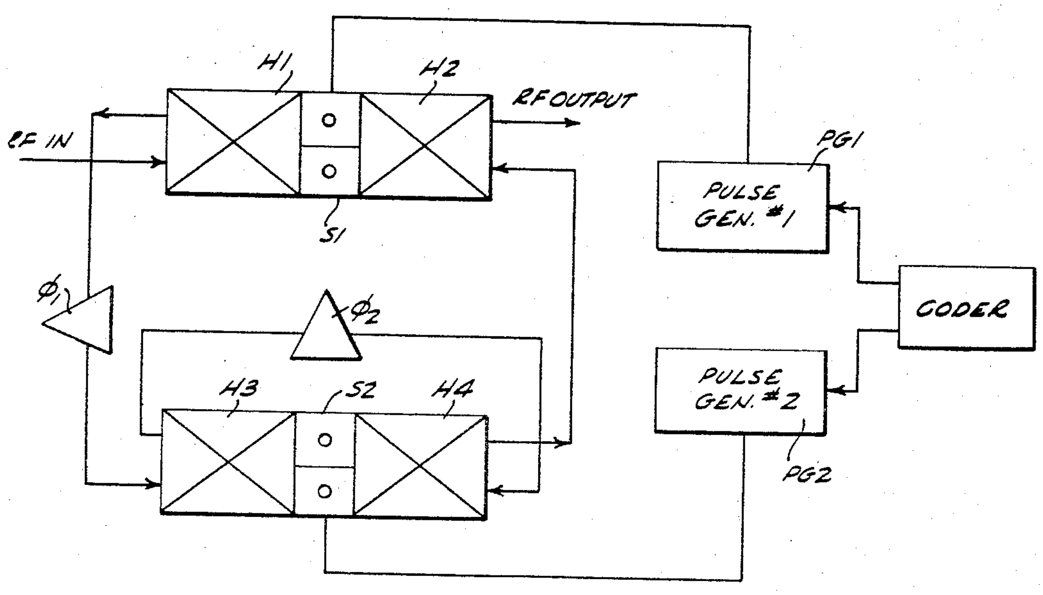
FIGURE 4 is a schematic diagram illustrating a multiplicity of hybrids and switches in embodiment used for poly-phase modulation of RF energy.

FIG. 4 illustrates another embodiment of the present invention utilizing a multiplicity of hybrids, multipactors as switching devices, and phase shifters to achieve polyphase coding. Riblet short slot hybrids H1, H2, H3 and H4 are employed in this exemplary embodiment, but other reciprocal hybrids may also be used. These Riblet short slot hybrids are complementary to each other and with this arrangement three different sequences of phase shifts are possible.

RF energy enters the Riblet hybrid H1, and if the multipactor S1 is quenched by an applied quenching voltage pulse from the pulse generator PG1 (as determined by the coder) the RF energy passes through Riblet hybrid H2 and out without being phase shifted. This path straight through H1 and H2 becomes the "zero degree" or reference phase of the RF carrier. If the multipactor S1 is not quenched, then RF energy is reflected from S1, passes through the phase shifter $\phi 1$ to the Riblet hybrid H3. When a quenching voltage pulse is applied to the multipactor S2 by pulse generator PG2, RF energy passes through hybrids H3 and H4 back to hybrid H2 and out, and being phase shifted by the predetermined amount set by phase shifter $\phi 1$.

With no quenching voltage pulse applied to multipactors S1 and S2, the RF energy passes through the phase shifters $\phi 1$ and $\phi 2$, is shifted in phase by the combined phase shift and passes out of hybrid H2.

Figure 5:
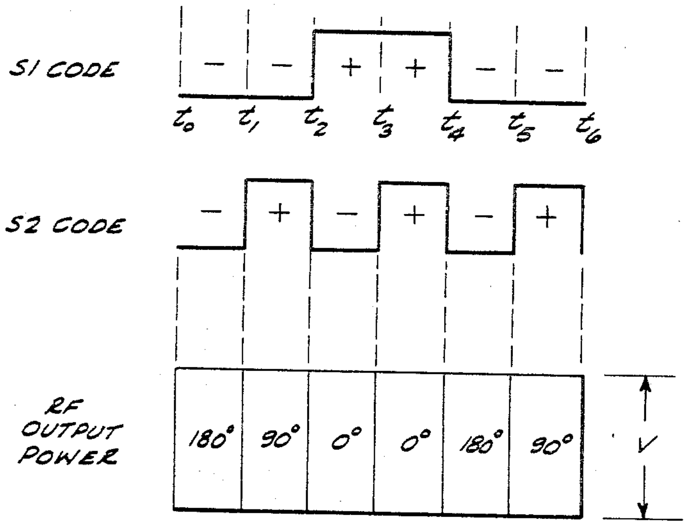
FIGURE 5 illustrates the constant amplitude power output poly-phase waveforms resulting from operation of the FIG. 4 embodiment.

FIG. 5 shows the codes for multipactors S1 and S2 as well as the output pulse sequence due to the operation of the arrangement shown in FIG. 4. The waveform showing the S1 code illustrates a code of six in the form of $--++--$ (or 001100). The waveform showing the S2 code is also a code of six, but in the form $-+-+-+$ (or 010101). The output power grouping of contiguous pulses illustrates the polyphase coded pulses resulting from the S1 and S2 codes with the phase shifters $\phi 1$ and $\phi 2$ being individually set to a 90° phase shift. Thus, as previously described, with multipactors S1 and S2 both reflecting the combined phase shift (90°+90°) will produce a 180° phase shift. When S1 is reflecting but S2 is not reflecting the phase shift is equal to the amount contributed by $\phi 1$ or 90°. However, any time that S1 is not reflecting there results a zero degree phase shift because no energy reaches the phase shifters.

It is to be noted that the voltage amplitude V of the output power pulses are equal. Such a result makes this polyphase coding embodiment more highly desirable than embodiments using non-reciprocal waveguide junctions.

A simple RF energy amplitude coding system presents another novel embodiment in accordance with the principles of the present invention and may be illustrated by referring to FIGS. 1 and 2. In FIG. 1 the phase shift device 20 and complementary hybrid 16 of FIG. 1 would be removed from the system shown, leaving the switch device **17*a* and 17*b* and hybrid junction 15 connected as shown. With multipactors used as the switching elements 17*a* or 17*b***, the electron multiplication is stimulated by a decrease of quenching voltage, while it is retarded by an increased quenching voltage. Such varying electron multiplication produces an RF energy reflection coefficient characteristic, such that degrees of RF reflection is achieved by controlling the multipactor action. This change of reflection coefficient produces corresponding amplitude changes in RF energy impinging upon the controlled multipactor. The most useful design of a multipactor is one which has a single port and equipped with a high reflectivity short. The high reflectivity short ensures that minimum loss of RF energy power exists.

By connecting the electronic attenuator 38 shown in FIG. 2 to the multipactors, together with the balance of the circuitry shown in FIG. 2, this simple amplitude coder produces a signal of the type shown at waveform 57 of FIG. 3.

While several embodiments of the invention have been shown and described, it is intended that the foregoing shall be considered only illustrative of the principles of the invention and not limiting in any sense.

What is claimed is:

1. A system for modulating electromagnetic energy comprising:

microwave means for controlling the phase of electromagnetic energy having first and second input ports and first and second output ports, said first input port having means for receiving said RF energy, said microwave means including switching means for selectively controlling the propagation of energy through said microwave means to be via either a direct path between said first input port and said second output port through said switching means or an indirect path between said first input port and said second output port;

phase shift means coupled between said first output port and said second input port for shifting the phase of said energy propagating therethrough; and control means for providing a synchronous control signal to said switching means whereby said energy is propagated through said direct path when said switching means is in a first condition, and through said indirect path when said switching means is in a second condition.

2. The system defined by claim 1 wherein said switching means comprises a multipactor.

3. A system for modulating RF carrier energy comprising:

a microwave coder having first and second input ports, and first and second output ports, said microwave coder including switching means for selectively controlling the energy propagation within said microwave coder to provide a first path between said first input port and said second output port, a second path between said first input port and said first output port, and a third path between said second input port and said second output port;

phase shift means coupled between said first output port and said second input port to provide a fourth path for shifting the phase of energy propagated therethrough;

a source of RF energy coupled to said first input port; and control means synchronized with said RF energy source for providing a control signal to said switching means whereby energy is propagated through said first path when said switching means is in a first condition and consecutively through said second, third, and fourth paths when said switching means is in a second condition.

4. An RF energy modulator, comprising:

waveguide means for controlling the phase of RF energy including means for receiving said RF energy at an input branch, a pair of branches having means for receiving said RF energy from said input branch in equal parts, and an output branch having means for receiving RF energy from said input branch, said waveguide means further including switching means coupled to said input branch, said output branch and said pair of branches for selectively controlling the propagation of said RF energy through said waveguide means; and signal generation means operatively coupled to said switching means for generating coded control signals which are applied to said switching means to maintain said switching means in either an open or closed condition.

5. An amplitude coding system for a high level source of RF energy, comprising:

hybrid waveguide junction means having a group of four terminals for carrying RF energy, the first terminal having means adapted for accepting said RF energy, and second and third terminals having means for receiving RF energy in substantially equal parts from said first terminal;

two single port multipactor means, mutually synchronous in operation and coupled to said second and third terminals respectively, having controllable electron discharge for attenuating said RF energy received at said second and third terminals and applying said attenuated RF energy to the fourth terminal of said junction means;

coder means, synchronized with said source of RF energy, for generating a sequence of coded signals; and distributive amplifier means coupled to said coder means for generating multi-level attenuation control voltages in response to said coded signals and applying said voltages to said multipactor means such that higher level atttenuation voltages decrease multipactor discharge to provide high attenuation of said received RF energy, and lower level attenuation voltages increase multipactor discharge to provide lower attenuation of said received RF energy.

6. In a system according to claim 5 wherein said hybrid waveguide junction means is comprised of an E-plane T and H-plane T combination.

7. A system for modulating a source of high level RF energy, comprising:

first microwave junction means having a first input terminal, coupled to said source, and first, second and third output terminals, for distributing the RF energy propagation within said junction means along a first path from said first input terminal to said first and second output terminals, and along a second path between said first input terminal and said third output terminal;

second microwave junction means, complementary to said first junction means and having second, third and fourth input terminals and a fourth output terminal for distributing RF energy propagation paths within said second junction means along a third path from said second and third input terminals to said fourth output terminal, and a fourth path between said fourth input terminal to said fourth output terminal;

multipactor means having first and second input ports and first and second output ports, said first and second input ports being coupled to said second and third output terminals, said first and second output ports being coupled to said second and third input terminals, for selectively controlling the propagation paths within said first and second junction means and between said first junction means and said second junction means;

phase shift means coupled between said third output terminal of the said first junction means and said fourth input terminal of said second junction means for shifting the phase of energy propagating therethrough; and pulse generation means synchronized with said RF energy source for generating a coded signal and applying said signal to said multipactor means such that said first path of said first junction means and said third path of said second junction means is activated when said multipactor assumes a first condition and said second path of said first junction means and said fourth path of said second junction means are activated when said multipactor assumes a different condition.

8. In a communications system having a source of high level RF energy, a coding system comprising:

first reciprocal waveguide junction having a group of four branches, the first of said branches coupled to said source and having a means for receiving said RF energy, for carrying said RF energy;

second reciprocal waveguide junction having a group of four branches arranged in complemental symmetry with said first junction, and coupled to said first junction at the reciprocal branches, for carrying RF energy from said first junction to the output branch of said second junction;

phase shift means coupled between said first and second junctions for shifting the phase of RF energy passing therethrough;

multipactor means coupled between said first and second junction means at said reciprocal branches for selectively controlling the passage of RF energy from said first junction to said second junction through said reciprocal branches or through said phase shift means;

digital coder means synchronized with said source for generating intelligence in the form of a predetermined binary coded wavetrain;

analog intelligence means synchronized with said digital coder means for generating an analog intelligence signal; and pulse generation means coupled to said binary and analog coders, and responsive to said wavetrain and said signal, for generating control pulses and applying said pulses to said multipactor means to control said multipactor means such that said RF energy passing from said first junction to said second junction contains coded intelligence.

9. In a system according to claim 7 wherein said junction means is comprised of a Riblet short-slot hybrid.

10. In a system according to claim 8 wherein said junction means is comprised of a hybrid ring.

11. A system for poly-phase coding high level RF carrier energy from a power output device, comprising:

first microwave coding means, having first and second input ports and first and second output ports, said first input port having means for receiving RF energy from said power output device, and including first multipactor means having controllable electron discharge for selectively controlling RF energy propagation within said coding means to provide a first path from said first input port to said second output port, a second path from said first input port to said first output port, and a third path from said second input port to said second output port;

second microwave coding means having third and fourth input ports and third and fourth output ports, said third input port having means for receiving RF energy from said first coding means, and including second multipactor means having controllable electron discharge for selectively controlling the RF energy propagation within said second coding means to provide a fourth path from said third input port to said fourth output port, fifth path from said third input port to said third output port and sixth path from said fourth input port to said fourth output port;

first phase shift means coupled between said first output port and said third input port to provide a seventh path for shifting the phase of RF energy propagating therethrough by a first amount;

second phase shift means coupled between said third output port and said fourth input port to provide an eighth path for shifting the phase of RF energy propagating therethrough by a second amount;

transmission line means for coupling said fourth output port to said second input port to provide a ninth RF energy propagation path;

first control means synchronized with said RF power output for generating quenching and non-quenching control voltages and applying them to said first multipactor means to control said electron discharge such that said first path is selected when said quenching voltage is present, and said second, third, and seventh paths are selected when said non-quenching voltage is present; and second control means operationally synchronized with said first control means for generating discharge inhibiting and non-inhibiting control voltages and applying them to said second multipactor means to control said electron discharge such that said fourth and ninth paths are selected when said non-quenching voltage is present at said first multipactor means simultaneously with said non-inhibiting voltage, and said fifth, sixth, eighth, and ninth paths are selected when said non-quenching voltage is present simultaneously with said inhibiting voltage.

12. A system for coding high level RF energy, comprising:

a first hybrid junction having first, second, third and fourth ports, said first port being adapted to receive said RF energy such that said RF energy entering at said first port divides into substantially equal parts and emerges from said second and third ports;

a second hybrid junction having fifth, sixth, seventh and eighth ports arranged as the symmetrical complement of said first hybrid junction, said fifth and sixth ports being operatively coupled to said second and third ports for allowing RF energy from said first junction to be propagated to said seventh port of said second junction;

first multipactor means coupled between said second port and said fourth port, having a selectively controllable electron discharge barrier, said barrier serving to reflect RF energy to said fourth port when in a first condition and allowing RF energy to be propagated from said second port to said fifth port when in a second condition;

second multipactor means, coupled between said third port and said sixth port having a selectively controllable electron discharge barrier, said barrier serving to reflect RF energy to said fourth port when in a first condition and allowing RF energy to be propagated from said third port to said fifth port when in a second condition;

variable phase shift means coupled between said fourth port and said eighth port for controllably shifting the phase of RF energy propagated therethrough;

distributive amplifier means coupled to said first and second multipactor means for generating control pulses and applying said control pulses simultaneously to each of said multipactors such that said first condition is selected in the absence of said pulses and said second condition is selected in the presence of said pulses; and coder means for providing code signals which are synchronized with said high level RF energy, said coder means being coupled to said distributive amplifier means whereby said control pulses are generated in accordance with said code.

References Cited

UNITED STATES PATENTS

| | | | |
|---|---|---|---|
| 3,235,820 | 2/1966 | Munuschian et al. | 333—10 X |
| 3,320,364 | 5/1967 | Steiner et al. | 325—163 X |

ROBERT L. GRIFFIN, *Primary Examiner.*

BENEDICT V. SAFOUREK, *Assistant Examiner.*

U.S. Cl. X.R.

325—163, 143; 332—10; 333—7